United States Patent [19]

Morgan

[11] Patent Number: 5,003,923
[45] Date of Patent: Apr. 2, 1991

[54] HEATED PET HOUSE

[76] Inventor: Sonny D. Morgan, Rte. 1 Box 4, Oceana, W. Va. 24870

[21] Appl. No.: 370,178

[22] Filed: Jun. 23, 1989

[51] Int. Cl.⁵ .............................................. A01K 1/00
[52] U.S. Cl. ........................................ 119/19; 119/15
[58] Field of Search ................. 119/15, 37, 27, 17, 119/18, 19

[56] References Cited

U.S. PATENT DOCUMENTS

| | | | |
|---|---|---|---|
| 1,563,107 | 11/1925 | Plunkett | 119/19 |
| 1,887,108 | 11/1932 | Steese | 119/19 |
| 1,973,029 | 9/1934 | Walston | 119/19 |
| 2,009,758 | 7/1935 | Blatchford | 119/19 |
| 2,997,022 | 8/1961 | Kay | 119/18 |
| 3,163,151 | 12/1964 | Bostwick | 119/19 |
| 3,280,796 | 10/1966 | Hatcher | 119/19 |
| 3,376,405 | 4/1968 | Gower, III | 119/37 |
| 3,830,201 | 8/1974 | Coulbourn | 119/17 |
| 3,962,993 | 6/1976 | Dattilo | 119/19 |
| 4,141,320 | 2/1979 | Hatfield | 119/37 |
| 4,201,153 | 5/1980 | Nace | 119/15 |
| 4,291,645 | 9/1981 | Cruchelow et al. | 119/19 |
| 4,332,214 | 6/1982 | Cunningham | 119/19 |
| 4,559,903 | 12/1985 | Bloom et al. | 119/19 |
| 4,729,343 | 3/1988 | Evans | 119/19 |
| 4,827,872 | 5/1989 | Sommers | 119/19 |

Primary Examiner—Paul J. Hirsch
Attorney, Agent, or Firm—Jerry T. Kearns

[57] ABSTRACT

A heated pet house has a hollow interior portion provided with a thermostatically controlled heater. A door in a side wall of the pet house is covered with a hinged flap to allow pet entry and exit. The pet house has a hinged roof to allow convenient human access. In a first embodiment, the thermostatically controlled heater includes an electrical resistance heating element connected for actuation by a thermostatic switch to a conventional AC power source. In a second embodiment, a step down transformer and rectifier are connected to an AC power source to supply a reduced DC voltage to a thermostat. A first relay coil is energized by activation of the thermostat with DC current to close relay contacts which connect a second relay coil to the AC power source. The second relay coil closes second and third pairs of relay contacts which connect an electrical resistance heating element to the AC power source. A pressure sensitive switch may be provided in the pet house for allowing operation of the heating element only when a pet is present within the interior.

1 Claim, 3 Drawing Sheets

HEATED PET HOUSE

BACKGROUND OF THE INVENTION

1. Field of the Invention

The present invention relates to pet houses, and more particularly pertains to a heated pet house to maintain pets in a comfortable environment during cold weather periods. Many individuals have pets, or have children who wish to have a pet, but do not wish to keep the pets within the interior of their home. Pets such as dogs and cats frequently shed hair which can aggravate allergic individuals. Additionally, pets can cause damage to furniture, carpeting and other home furnishings. In order to allow such individuals to keep pets, a variety of different forms of outdoor pet houses have been developed. These conventional pet houses are typically unheated and thus subject the pet to extremely cold temperatures during winter months. In order to overcome this problem, the present invention provides a heated pet house having a thermostatically controlled electric heater to maintain a pet in a comfortable and humane environment during cold winter months.

2. Description of the Prior Art

Various types of pet houses and enclosures are known in the prior art. A typical example of such an enclosure is to be found in U.S. Pat. No. 4,201,153, which issued to G. Nace on May 6, 1980. This patent discloses a modular assembly of enclosures which may be connected as required to provide a habitat for small animals. The system utilizes a serial drain connection for maintaining adjustable environmental conditions in each of the modular units. U.S. Pat. No. 4,332,214, which issued to L. Cunningham on June 1, 1982, discloses a protected heated pet bed or support having an interior reservoir of heated water maintained at a predetermined temperature by a thermostatic control unit. A removable cover for the bed allows the formation of a heated enclosure. U.S. Pat. No. 4,559,903, which issued to P. Bloom et al on Dec. 24, 1985, discloses a pet dryer including an enclosure having hinged side wall doors communicating with a hollow interior portion. A blower discharges air past a heater for directing heated air on a pet. U.S. Pat. No. 4,729,343, which issued to L. Evans on Mar. 8, 1988, discloses a sleeping enclosure for a pet having a flat bottom and an arch roof framework formed from a semi-rigid material. The device provides an insulated collapsible sleeping enclosure for dogs and cats.

While the above mentioned devices are directed to pet enclosures, none of these devices disclose a pet house including a covered enclosure having a hollow interior portion provided with an efficient thermostatically controlled heater. Additional features of the present invention, not contemplated by the aforementioned prior art devices, include the provision of a hinged roof, the use of a pressure sensitive switch connected to allow activation of the heater only when a pet is within an interior of the house, the use of a guide track system to allow convenient removal and installation of the heating unit, and a thermostatically controlled system utilizing a transformer, a rectifier and a pair of relays for connecting an AC power source to an electrical resistance heating element upon actuation of a DC controlled thermostat. Inasmuch as the art is relatively crowded with respect to these various types of pet houses, it can be appreciated that there is a continuing need for and interest in improvements to such pet houses, and in this respect, the present invention addresses this need and interest.

SUMMARY OF THE INVENTION

In view of the foregoing disadvantages inherent in the known types of pet houses now present in the prior art, the present invention provides an improved heated pet house. As such, the general purpose of the present invention, which will be described subsequently in greater detail, is to provide a new and improved heated pet house which has all the advantages of the prior art pet houses and none of the disadvantages.

To attain this, representative embodiments of the concepts of the present invention are illustrated in the drawings and make use of a heated pet house having a hollow interior portion provided with a thermostatically controlled heater. A door in a side wall of the pet house is covered with a hinged flap to allow pet entry and exit. The pet house has a hinged roof to allow convenient human access. In a first embodiment, the thermostatically controlled heater includes an electrical resistance heating element connected for actuation by a thermostatic switch to a conventional AC power source. In a second embodiment, a step down transformer and rectifier are connected to an AC power source to supply a reduced DC voltage to a thermostat. A first relay coil is energized by activation of the thermostat with DC current to close relay contacts which connect a second relay coil to the AC power source. The second relay coil closes second and third pairs of relay contacts which connect an electrical resistance heating element to the AC power source. A pressure sensitive switch may be provided in the pet house for allowing operation of the heating element only when a pet is present within the interior.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved heated pet house which has all the advantages of the prior art pet houses and none of the disadvantages.

It is another object of the present invention to provide a new and improved heated pet house which may be easily and efficiently manufactured and marketed.

It is a further object of the present invention to provide a new and improved heated pet house which is of a durable and reliable construction.

An even further object of the present invention is to provide a new and improved heated pet house which is susceptible of a low cost of manufacture with regard to both materials and labor, and which accordingly is then susceptible of low prices of sale to the consuming public, thereby making such pet houses economically available to the buying public.

Still yet another object of the present invention is to provide a new and improved heated pet house which provides in the apparatuses and methods of the prior art some of the advantages thereof, while simultaneously overcoming some of the disadvantages normally associated therewith.

Still another object of the present invention is to provide a new and improved heated pet house which allows pets such as dogs and cats to be maintained in comfortable and humane conditions during cold winter months.

Yet another object of the present invention is to provide a new and improved heated pet house which includes a thermostatically controlled heating element removably installed within an enclosure and having a hinged roof to facilitate convenient maintenance.

Even still another object of the present invention is to provide a new and improved heated pet house which includes a pressure sensitive switch to allow activation of a thermostatically controlled heater only when a pet is present within the interior of the house.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
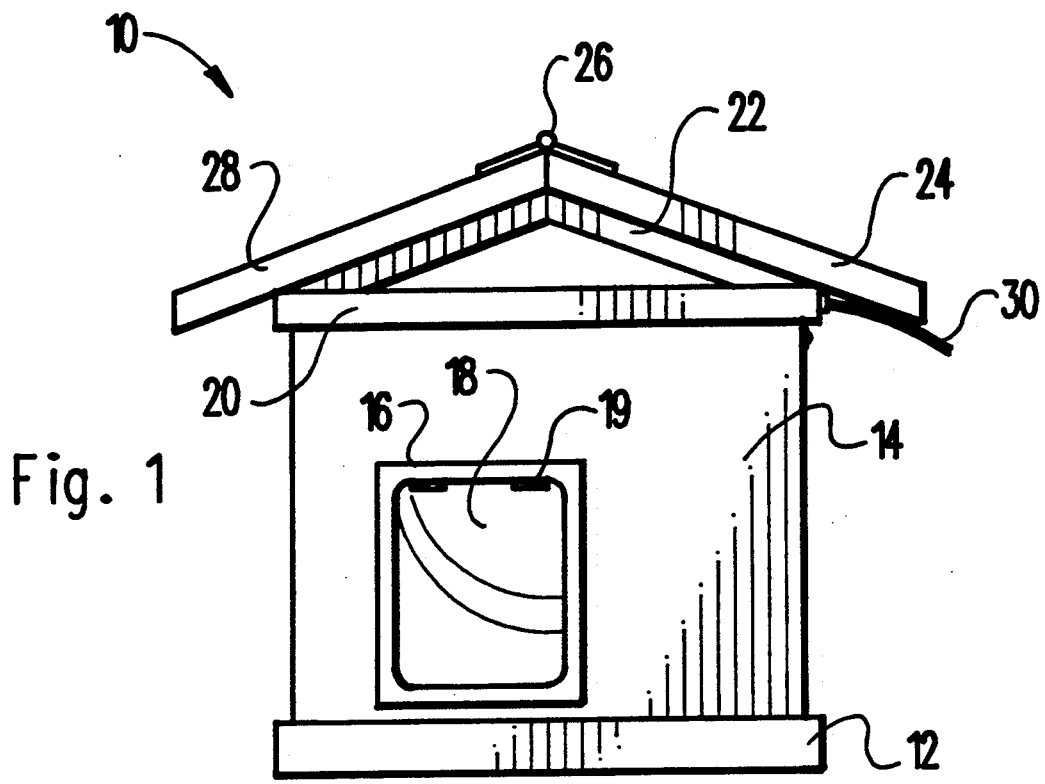
FIG. 1 is an end elevational view illustrating the heated pet house according to the present invention.

With reference now to the drawings, and in particular to FIG. 1 thereof, a new and improved heated pet house embodying the principles and concepts of the present invention and generally designated by the reference numeral 10 will be described.

More specifically, it will be noted that the first embodiment 10 of the invention includes a generally rectangular enclosure having a base 12 and an end wall 14. A door 16 formed in the end wall 14 includes a hinged flap 18 pivotally secured by hinges 19 to allow entry and exit of a pet. A ceiling portion 20 includes a pitched roof portion 22 having diverging inclined portions 24 and 28 connected by a hinge 26. This allows one, or both of the roof portions 24 and 28 to be manually opened to allow convenient access to the interior of the pet house 10. A power cord 30 provides an AC power source to a thermostatically controlled heating unit within the interior of the house 10.

Figure 2:
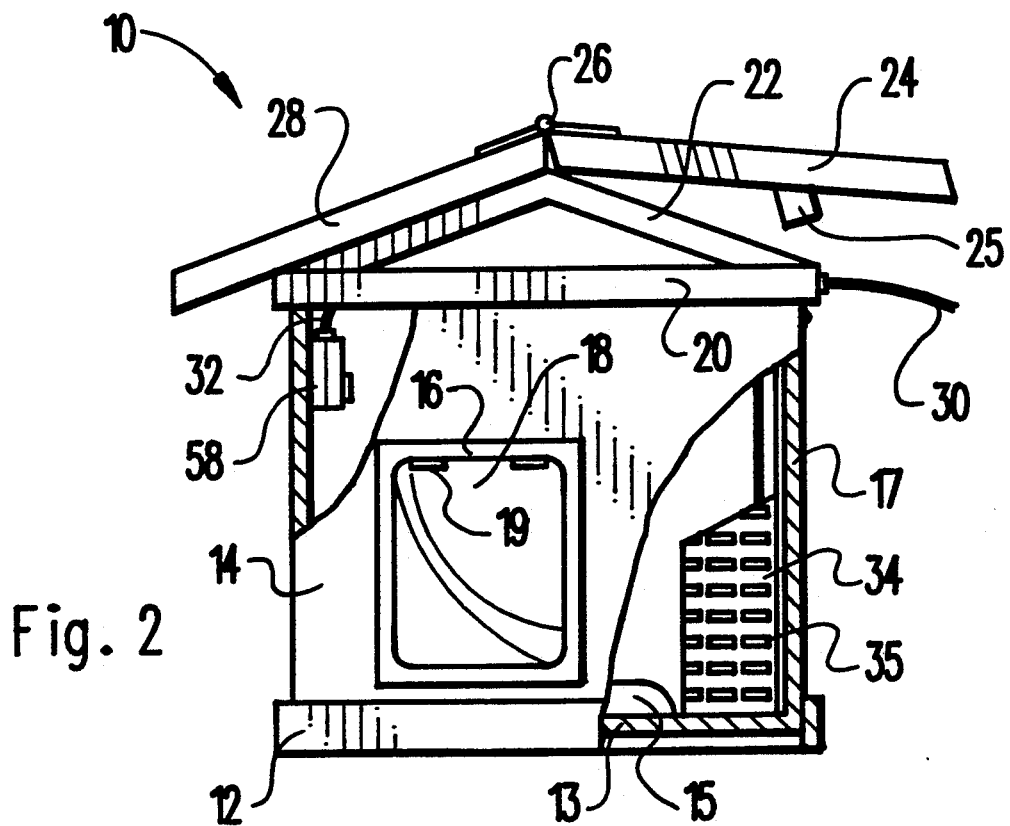
FIG. 2 is an end elevational view of the heated pet house, partially cut away and depicting a hinged roof in a partially open position.

FIG. 2 illustrates the house 10, with the end wall 14 partially cut away to illustrate a heating unit 34 consisting of a box-shaped housing having a plurality of vent apertures 35 for communicating heated air to the interior of the house 10. A resilient pad 15 may be provided on an interior floor portion 13 of the house 10 to provide comfort to a pet. A thermostat 58 is mounted on an interior side wall of the house 10 and includes a control wiring cable 32 operatively connected with the heating unit 34. A latch member 25 may be provided on each of the roof portions 24 and 28 for securing the roof portions in a closed position. The hinge 26 may be secured by an end bracket to the stationary roof portion 22 to allow simultaneous opening of both roof portions 24 and 28. AlternativelY, the roof portion 28 may be secured in a stationary position and only the roof portion 24 mounted for pivotal movement.

Figure 3:
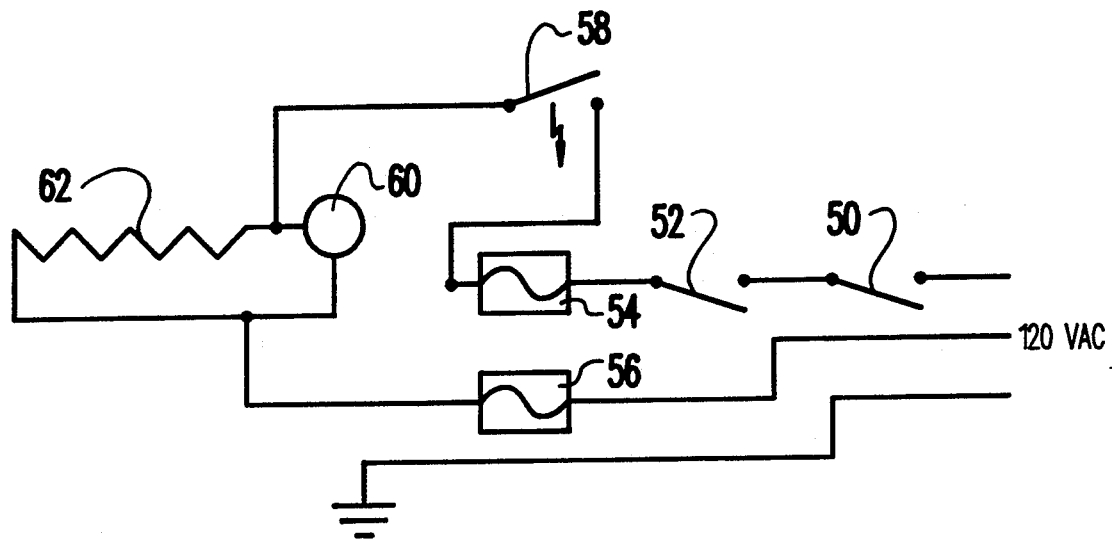
FIG. 3 is a schematic diagram illustrating a thermostatic heating system according to a first embodiment of the present invention.

FIG. 3 is a schematic diagram which illustrates a thermostatically controlled heating system according to a first embodiment of the present invention. A conventional source of 120 VAC current is selectively connectable by a manually actuated switch 50 through a pair of fuses 54 and 56 to an electrical resistance heating element 62. A thermostatically controlled switch 58 closes the circuit to energize the heating element 62 and an indicating lamp 60. An additional switch 52 may be provided in series with the switch 50 in order to allow activation of the heating element 62 only when a pet is present within the interior of the pet house. The switch 52 is preferably a pressure sensitive type switch to be subsequently illustrated and described.

Figure 4:
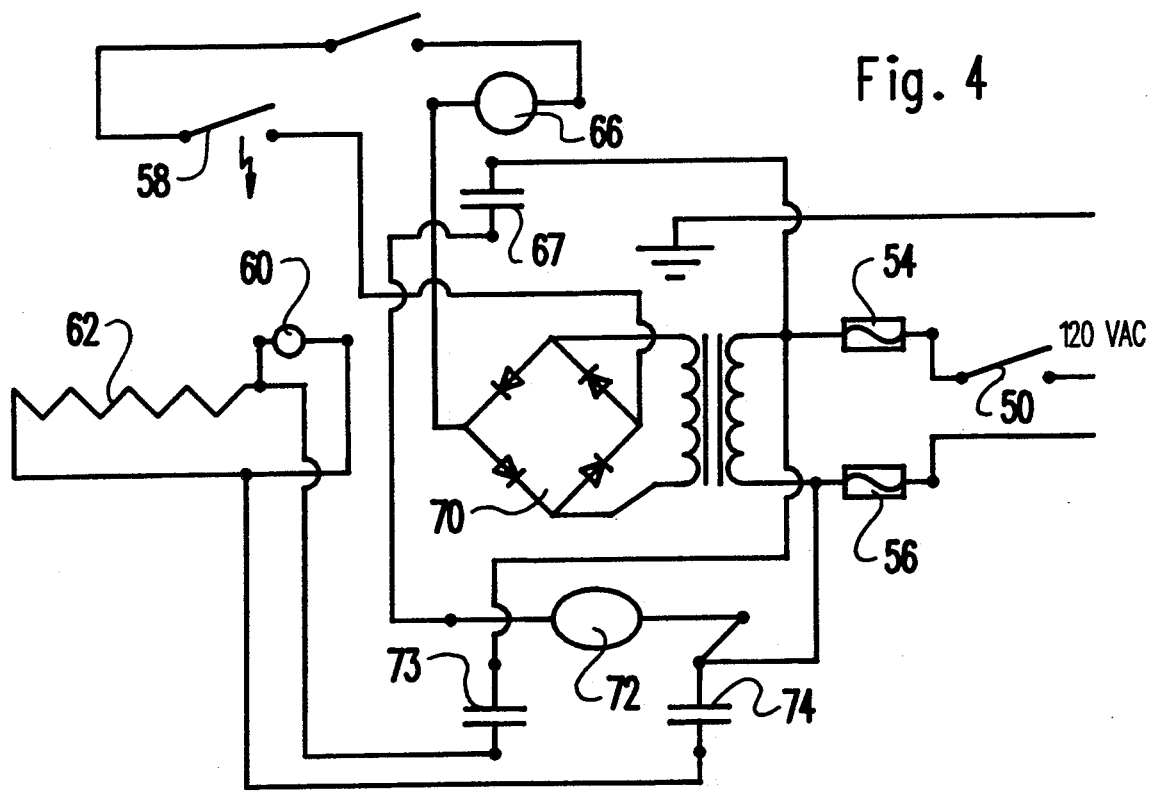
FIG. 4 is a schematic diagram illustrating a thermostatic heating system according to a second embodiment of the present invention.

FIG. 4 illustrates an alternative thermostatically controlled heating system which includes a conventional source of 120 VAC selectively connectable by a manual switch 50 through a pair of fuses 54 and 56 to the primary stage of a transformer 68. The secondary stage of the transformer 68 is connected to a full wave wave rectifier 70 for producing a reduced voltage DC current, preferably about 30 volts. The DC current output from the rectifier 70 is operatively connected to a first relay coil 66 by a thermostatically controlled switch 58 and by a pressure sensitive switch 52. Upon closing of both the switches 58 and 52, the relay coil 66 is energized to close a first pair of relay contact 67 which are operative to supply a second relay coil 72 with a 120 VAC current. Energization of the second relay coil 72 closes second 73 and third 74 pairs of relay contacts to connect the electrical resistance heating element 62 and indicating lamp 60 to the 120 VAC power source. Thus, the control system provides a reduced control voltage for the thermostat 58 and relay 66 which affords safety advantages and allows the use of less expensive components.

Figure 5:
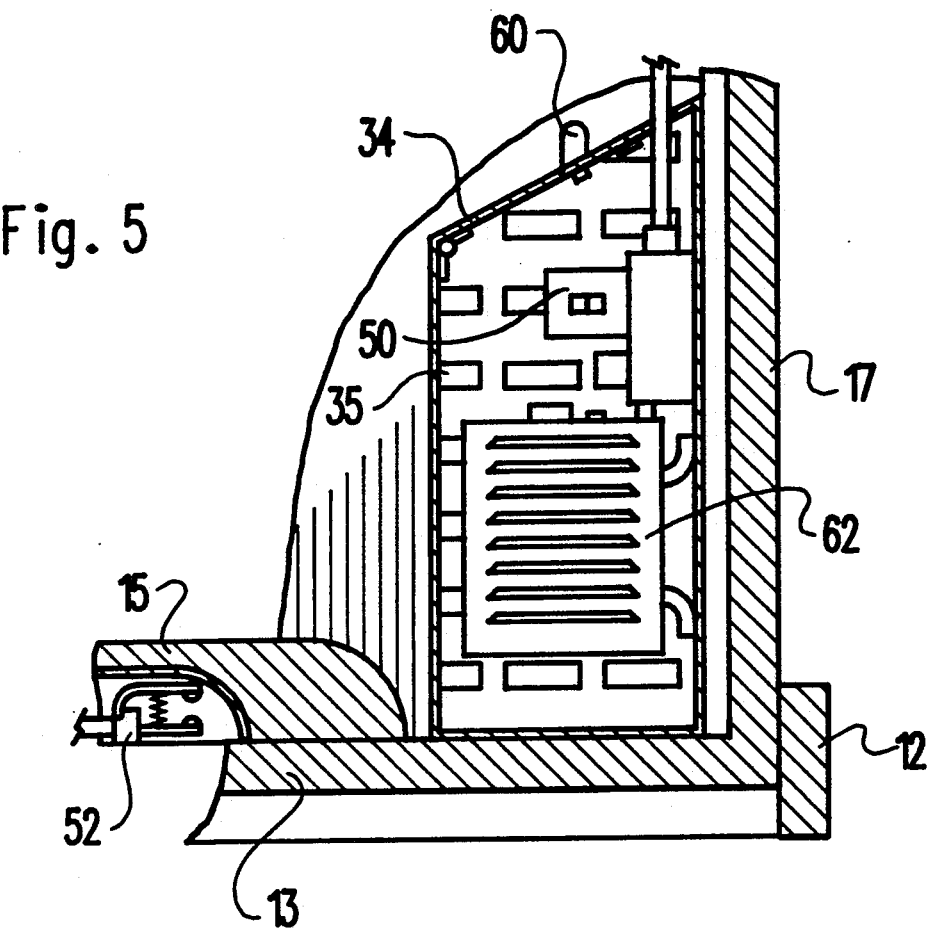
FIG. 5 is a cross sectional detail view further illustrating the constructional features of the heating system.

FIG. 5 is a cross sectional detail view which illustrates the heating element 62 within the interior of the box like housing 34. The heating element 62 may include an electric blower for circulating heated air outwardly through the vent apertures 35 provided in the housing 34. The indicating lamp 60 may be provided in a variety of locations, including on the exterior portion of the pet house, or on the exterior portion of the housing 34, within the interior of the pet house. The pressure sensitive switch 52 includes a pair of spaced closable contacts separated by a coil spring. The switch 52 may be located within a recessed interior portion of a resilient pad 15. When an animal steps or lies on the surface of the pad 15, the contacts of the switch 52 are closed, thus allowing activation of the heating element 62. The pressure switch 52 may be formed in a variety of alternative construction without departing from the scope of the present invention. For example, the interior floor 13 of the pet house may comprise a movable plate biased slightly upwardly by the spring of the switch 52. In any event, the pressure switch 52 is an optional feature of the invention which conserves on electrical energy by preventing the operation of the heating element 62 when a pet is not present within the interior of the pet house.

Figure 6:
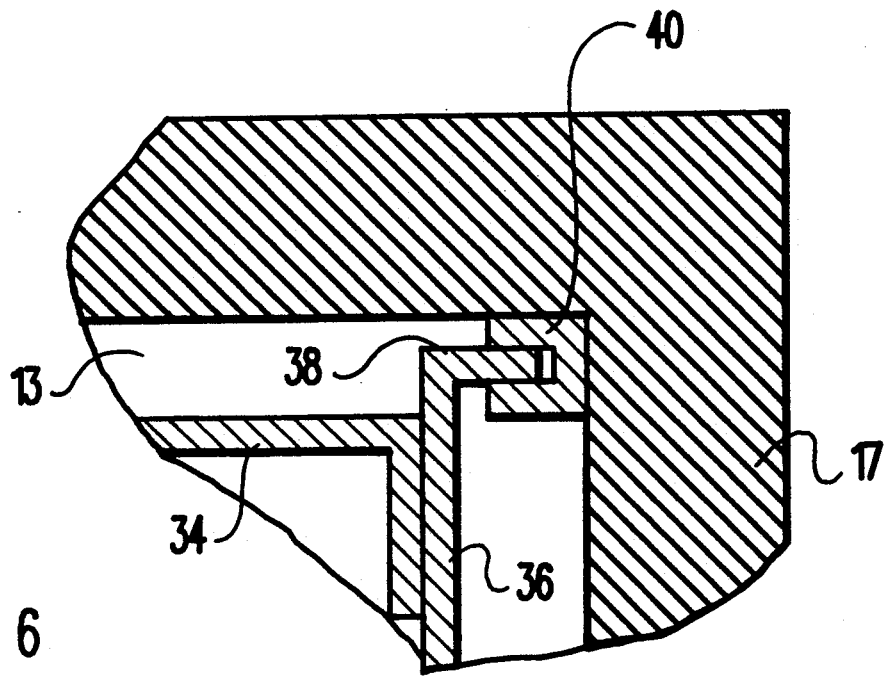
FIG. 6 is a cross sectional view illustrating the mounting of the heating unit within an interior of the pet house.

FIG. 6 is a cross sectional detail view which illustrates a mounting plate 36 provided on a back wall of the heating unit housing 34, facing the exterior side wall 17. It is contemplated that the opposite side of the mounting plate 36 is symmetrically constructed. The mounting plate 36 includes a pair of right angular guide runners 38 which are slidably received within a pair of spaced guide track members 40. This facilitates maintenance of the heating unit 34 by allowing vertical removal through the hinged roof portion 24 illustrated in FIG. 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A heated pet house, comprising:
   a covered enclosure having a hollow interior portion;
   a door in a side wall of said enclosure for allowing pet entry and exit;
   a hinged roof on said enclosure for allowing human access to said hollow interior portion;
   an electrical resistance heating element in said hollow interior portion;
   an indicating lamp operably connected to indicate operation of said heating element;
   a transformer having a primary stage connected to an AC power source;
   first switch means for selectively manually disconnecting said primary stage from said AC power source;
   said transformer having a secondary stage connected to a rectifier for producing reduced voltage DC current;
   a first relay coil;
   a thermostat for connecting said DC current from said rectifier to said first relay coil at a preset temperature within said enclosure;
   a second relay coil;
   a first pair of relay contacts activated by said first relay coil and operatively connected to connect said second relay coil to said AC power source;
   second and third pairs of relay contacts activated by said second relay coil to connect said heating element to said AC power source;
   a housing enclosing said heating element and having a back wall provided with spaced, projecting guide runners;
   vertical recessed guide tracks in said enclosure for removably receiving said guide runners to facilitate manual removal and installation of said heater;
   second switch means operatively connected for connecting said DC current from said rectifier to said first relay coil only when a pet is within said hollow interior enclosure portion; and
   said second switch means including a pressure sensitive switch possessing spaced closable contact members separated by a coil spring; and
   said closable contact members disposed within a recessed interior portion of a resilient pad disposed on a floor of said hollow interior portion for actuation by a pet's weight on said floor.

* * * * *